Figure 1:
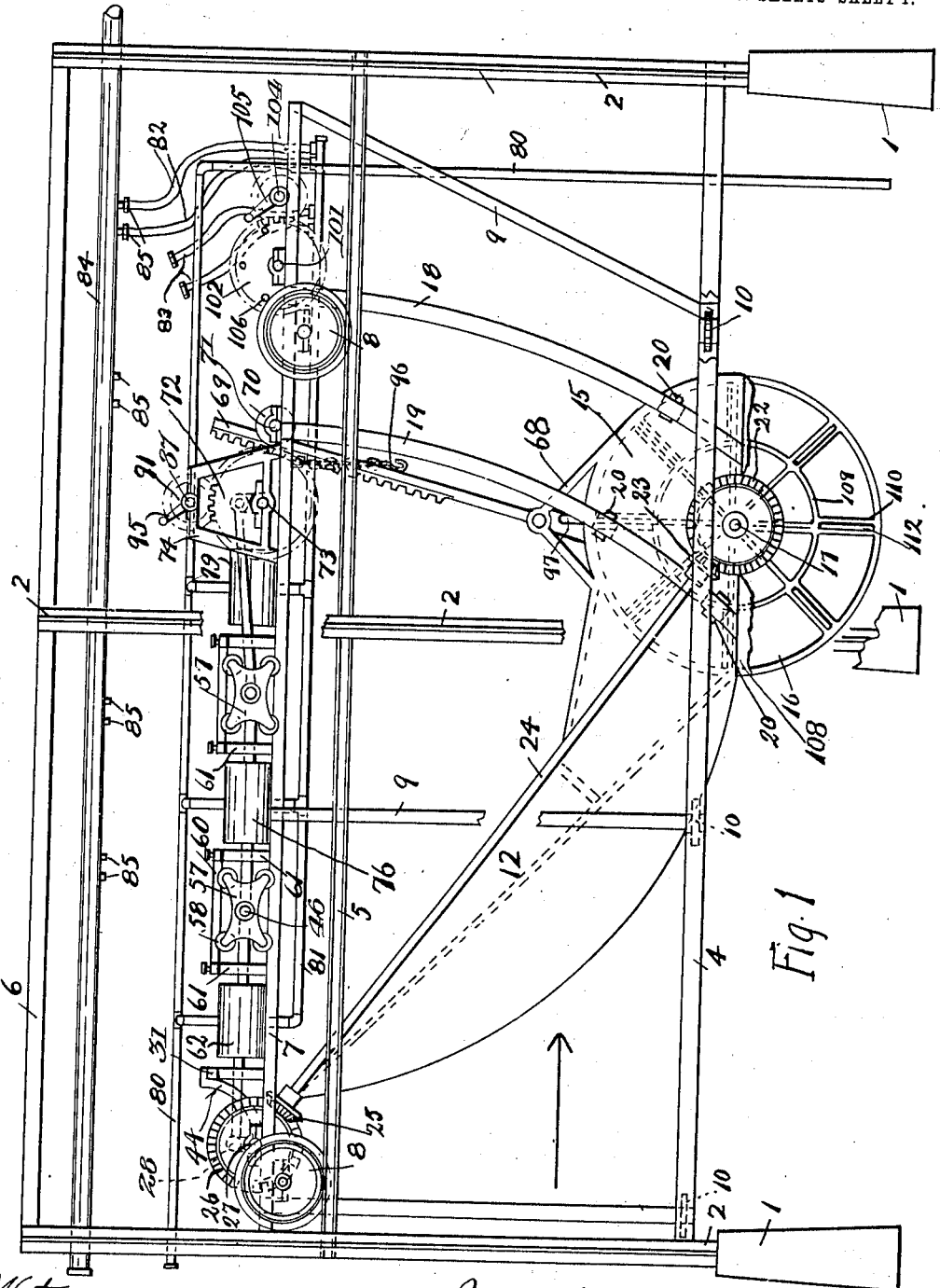

J. WILLY.
WAVE MOTOR.
APPLICATION FILED SEPT. 7, 1910.

1,055,378.

Patented Mar. 11, 1913.
10 SHEETS—SHEET 1.

Witnesses
F. B. Griffin
E. R. Blake

Inventor
John Willy by
Carlos P. Griffin his Attorney

J. WILLY.
WAVE MOTOR.
APPLICATION FILED SEPT. 7, 1910.

1,055,378.

Patented Mar. 11, 1913.
10 SHEETS—SHEET 2.

Witnesses
F. B. Griffin
E. R. Blake

Inventor
John Willy by
Carlos P. Griffin
Attorney

J. WILLY.
WAVE MOTOR.
APPLICATION FILED SEPT. 7, 1910.

1,055,378.

Patented Mar. 11, 1913.
10 SHEETS—SHEET 6.

Witnesses
F. B. Griffin
E. R. Blake

Inventor
John Willy by
Carlos P. Griffin
Attorney

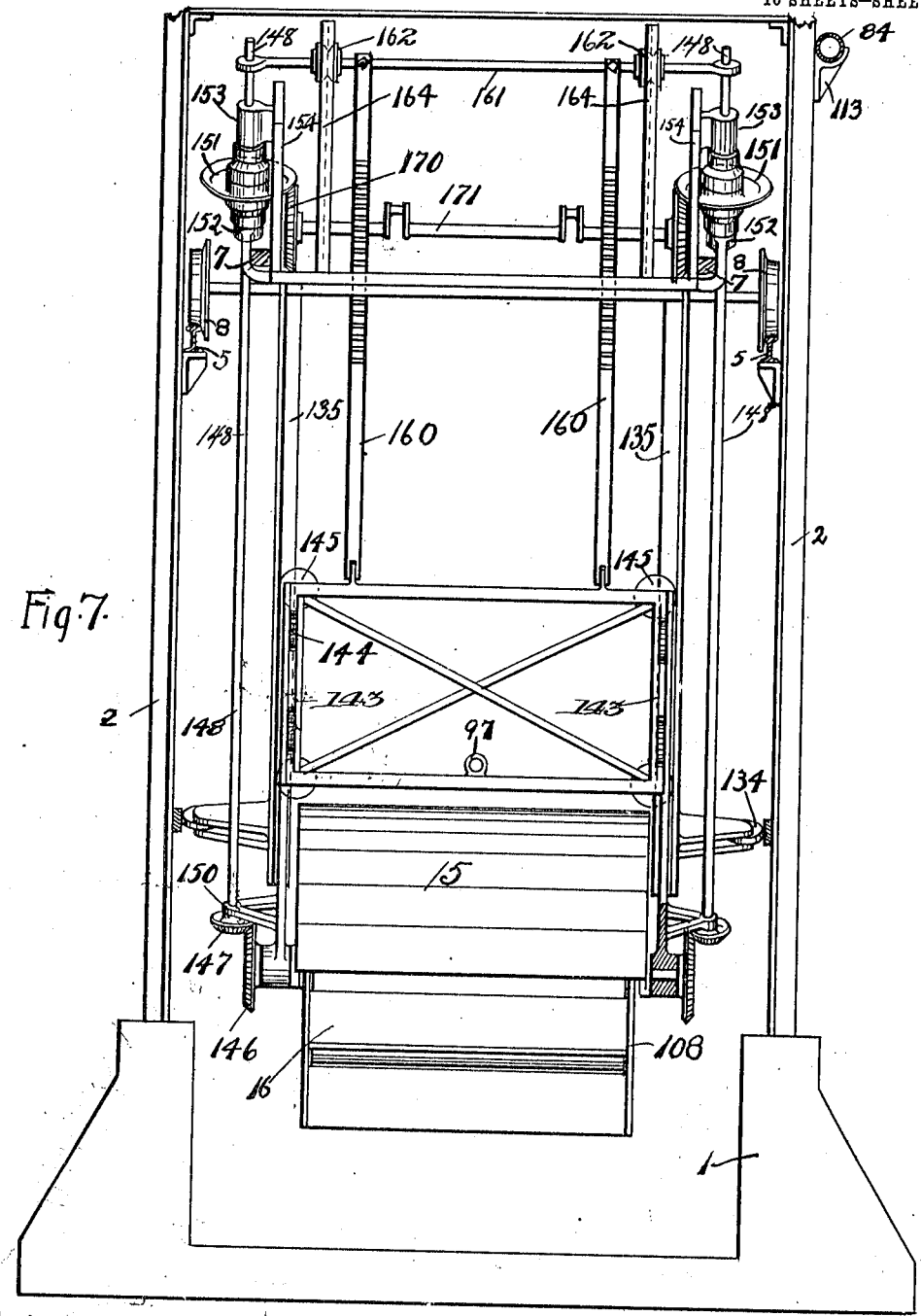

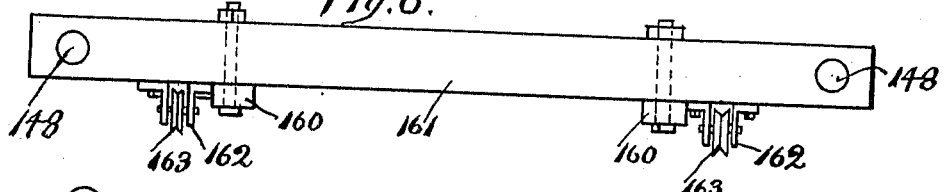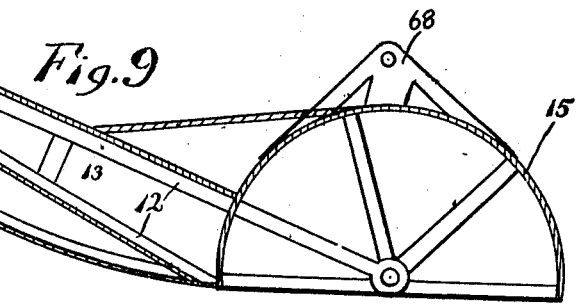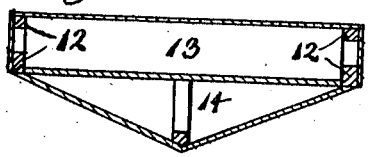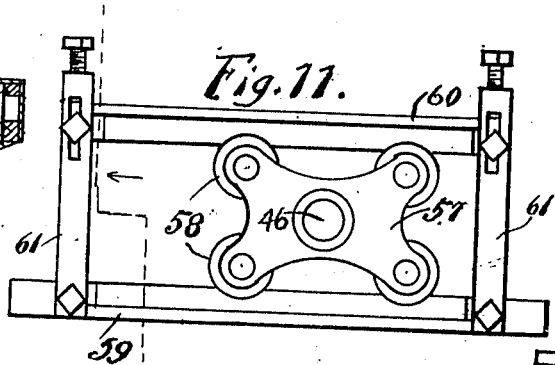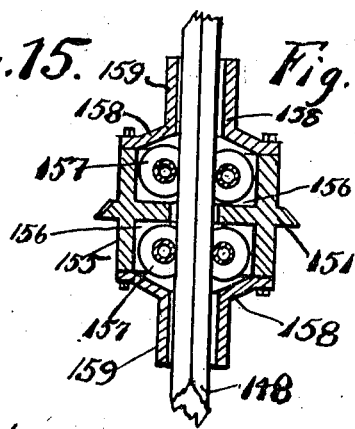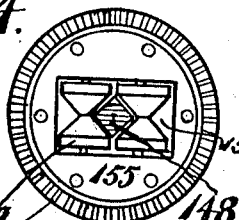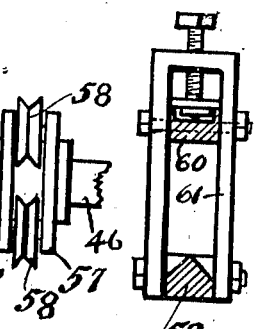

J. WILLY.
WAVE MOTOR.
APPLICATION FILED SEPT. 7, 1910.
1,055,378.
Patented Mar. 11, 1913.
10 SHEETS—SHEET 9.
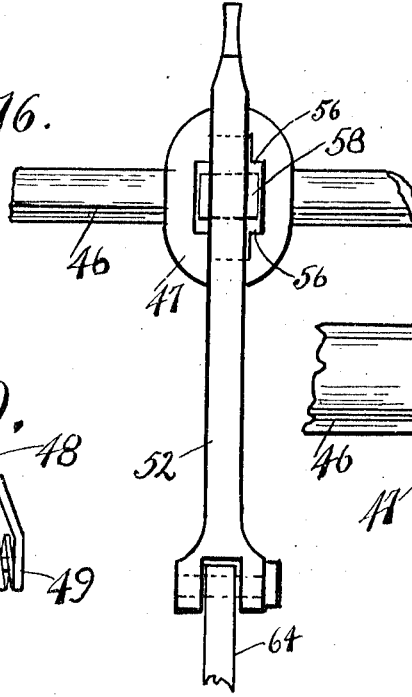
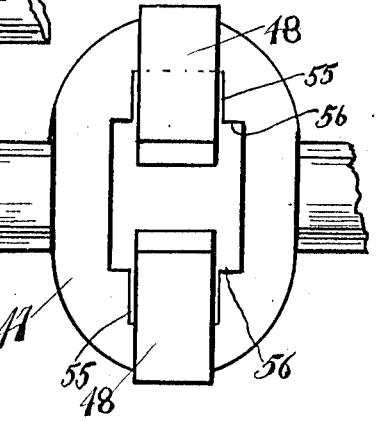
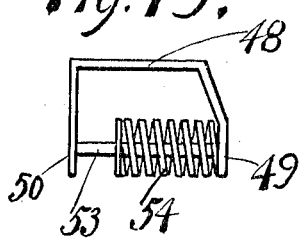
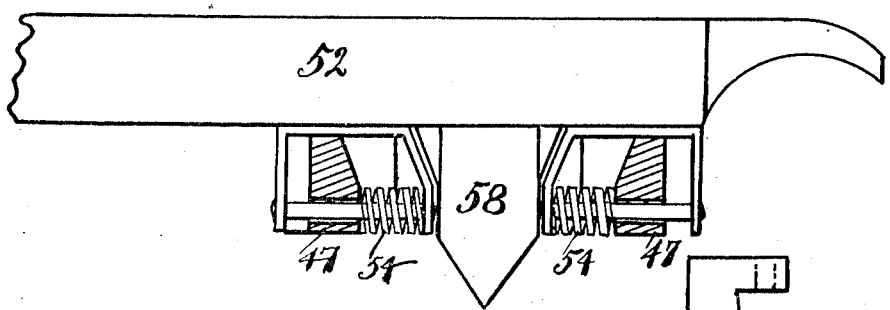
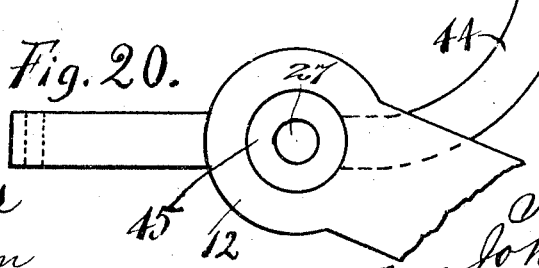
Witnesses
F. B. Griffin
E. R. Blake
Inventor
John Willy by
Carlos P. Griffin Attorney

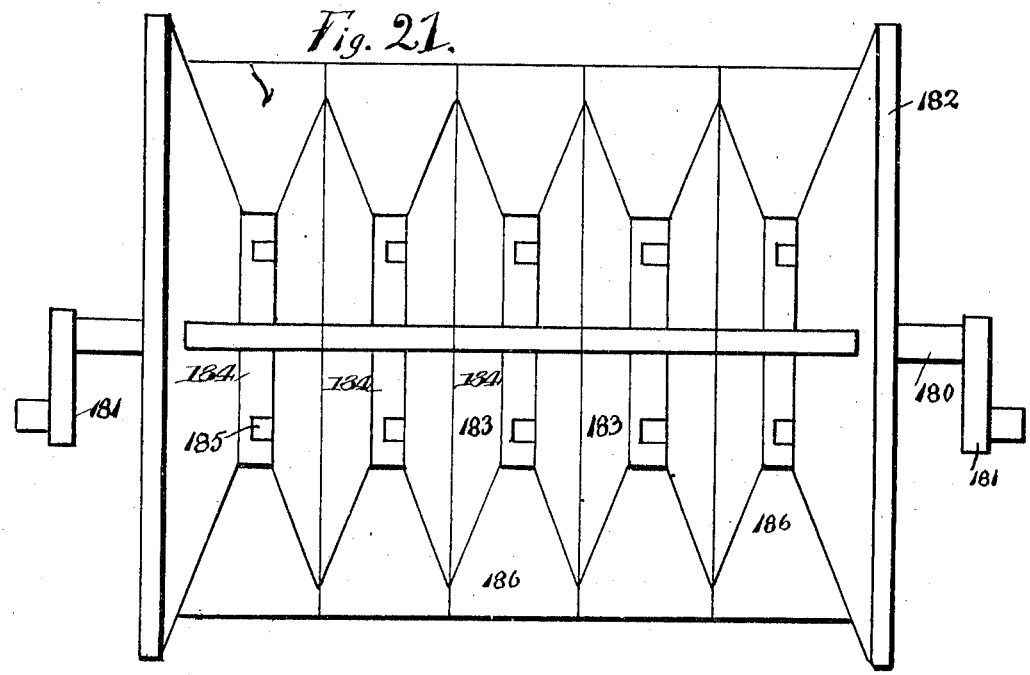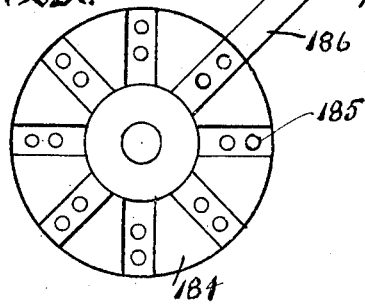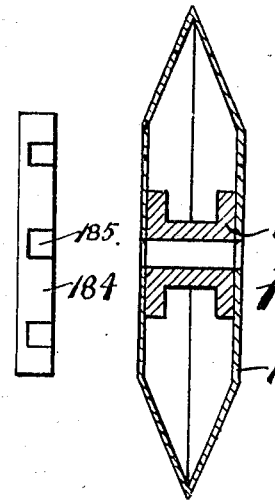

UNITED STATES PATENT OFFICE.

JOHN WILLY, OF SAN FRANCISCO, CALIFORNIA.

WAVE-MOTOR.

1,055,378.  Specification of Letters Patent.  Patented Mar. 11, 1913.

Application filed September 7, 1910. Serial No. 580,824.

*To all whom it may concern:*

Be it known that I, JOHN WILLY, a citizen of the United States, residing at San Francisco, in the county of San Francisco and State of California, have invented a new and useful Wave-Motor, of which the following is a specification in such full and clear terms as will enable those skilled in the art to construct and use the same.

This invention relates to a wave motor and its objects are to provide means whereby the rotary movement given the paddle wheel may be transmitted to suitable pumps for storing water at any desired elevation, and whereby the up and down movement given to the paddle wheel and its supporting parts may be transmitted to other pumps for storing water.

Another object of the invention is to provide an apparatus for use over a considerable distance, the object being to provide means whereby the breakers may be utilized at either low tide or at high tide. It will be understood that at low tide the breakers will form at a different place from which they form at high tide, and the apparatus must be moved accordingly, in order to make use of the greatest waves.

Another object of the invention is to provide means whereby one or more pumps may be operated by the apparatus at a given time, since with heavy waves breaking more power would be generated than with low waves breaking, in which event it would be necessary to throw out of operation some of the pumps.

Another object of the invention is to provide means whereby the paddle wheels will be supported above the surface of the ground when the apparatus is used in shallow water, thus preventing the breakage of said wheels upon striking the bottom.

Another object of the invention is to provide means whereby the power transmitting mechanism may be lifted out of the water to avoid injury thereto at times of great storms.

Another object of the invention is to provide a float shield to prevent the waves from breaking over the paddle wheel, and thus either destroying it or delivering energy thereto in such a manner as to tend to rotate the wheel in the reverse direction from which it should rotate.

Another object of the float shield is to direct the current of the waves below the axis of the paddle wheel, and in the same manner develop power by the lifting of the entire mass.

Another object of the invention is to provide mechanical means whereby the float shield and paddle wheel journaled therein will be lifted out of the water as evenly as possible, a rack bar at each end of the paddle wheel being used to accomplish this object.

Another object of the invention is to provide a paddle wheel which will have such buoyancy as to prevent the complete submersion thereof in the water, the air chamber used in said paddle wheel supporting the same with the majority of the wheel above the surface of the water.

Another object of the invention is to provide a pier for the installation of the motor, which will be merely placed in position and which is of sufficient strength and rigidity to dispense with the necessity of driving piles or caissons.

Figure 2:
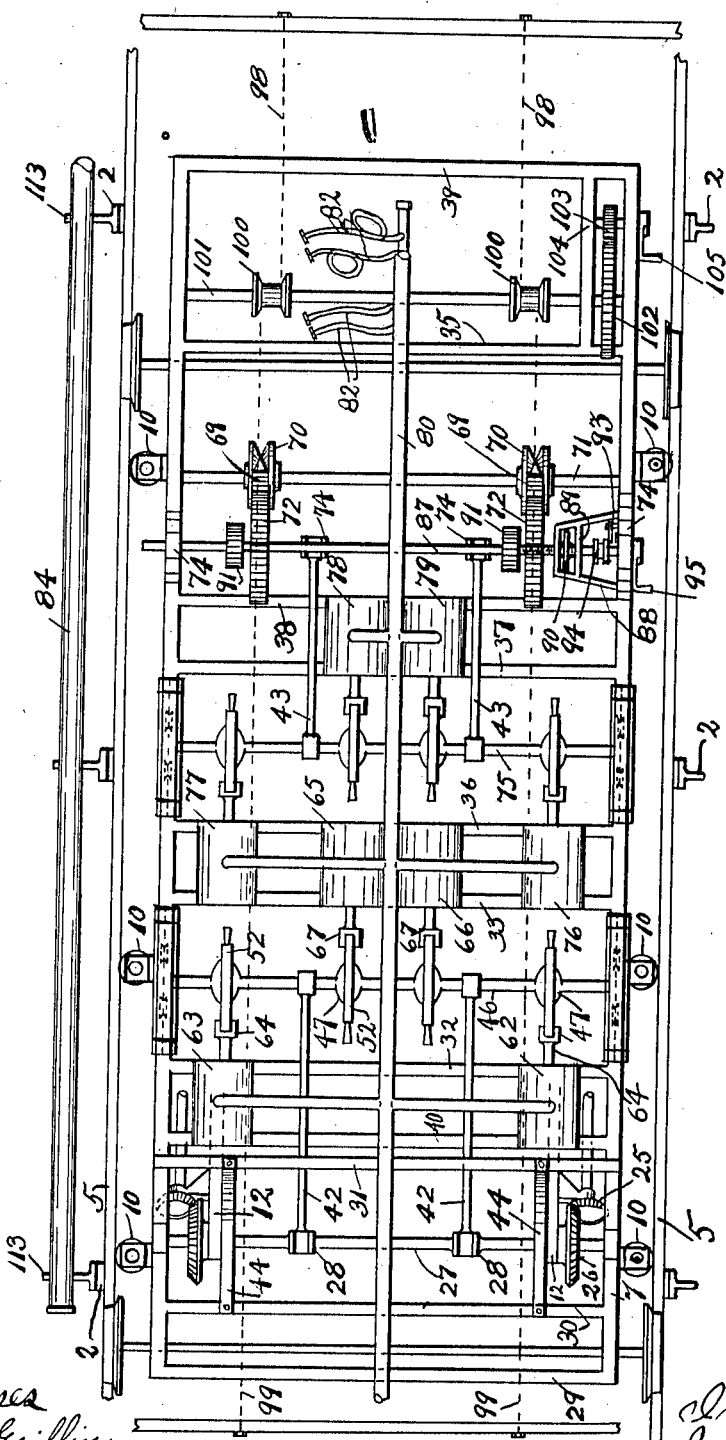
Figure 3:
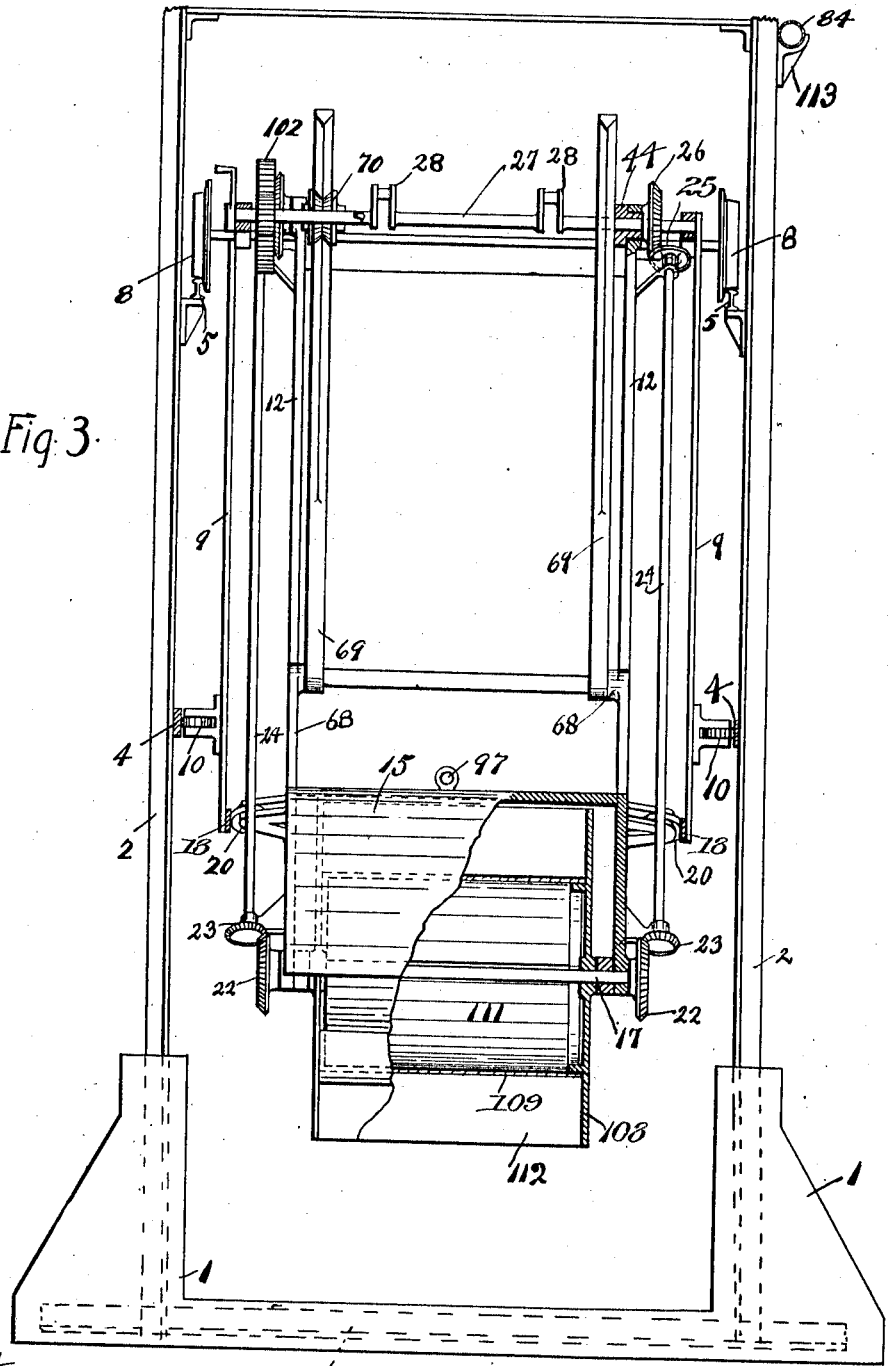
Figure 4:
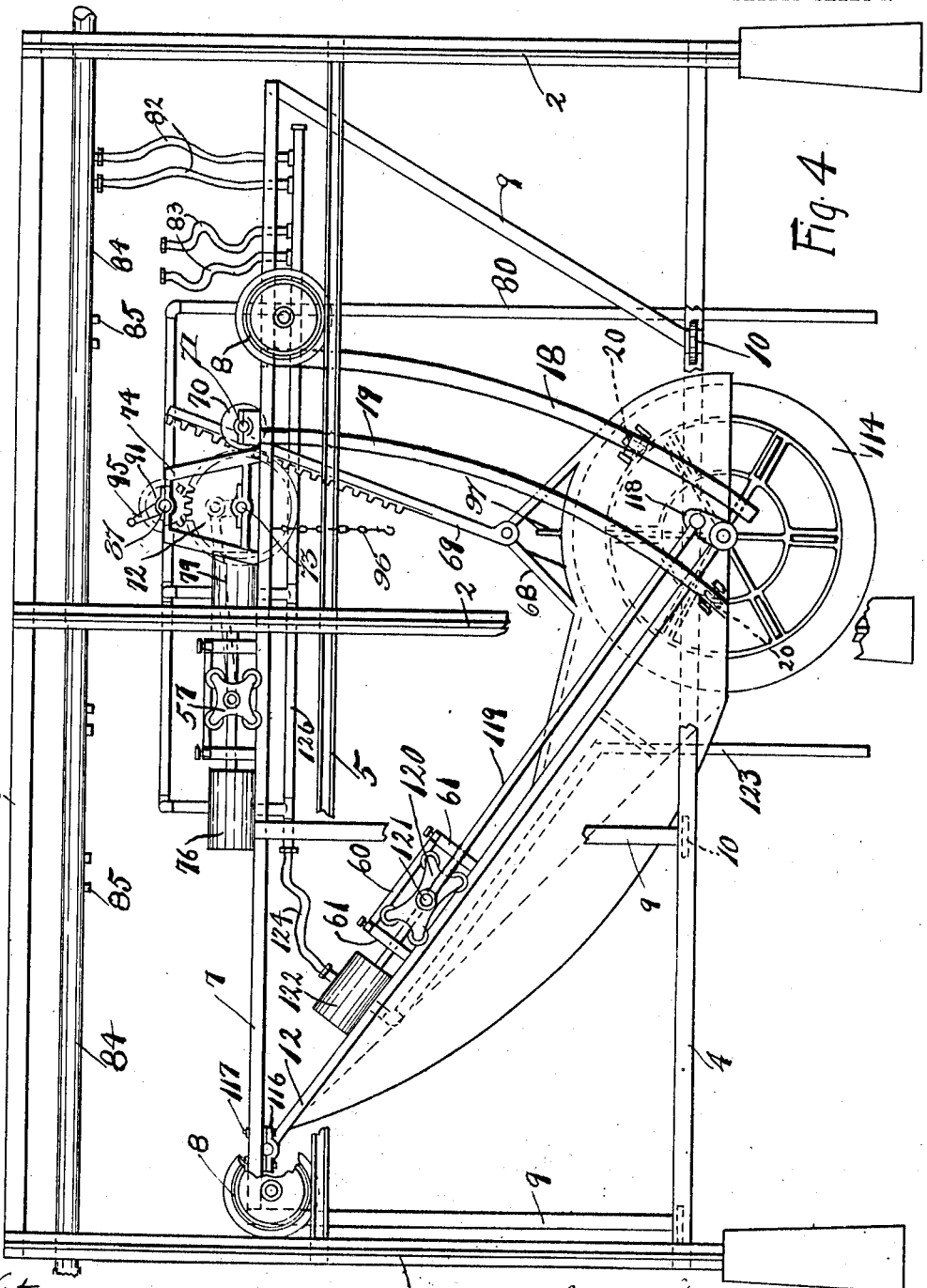
Figure 5:
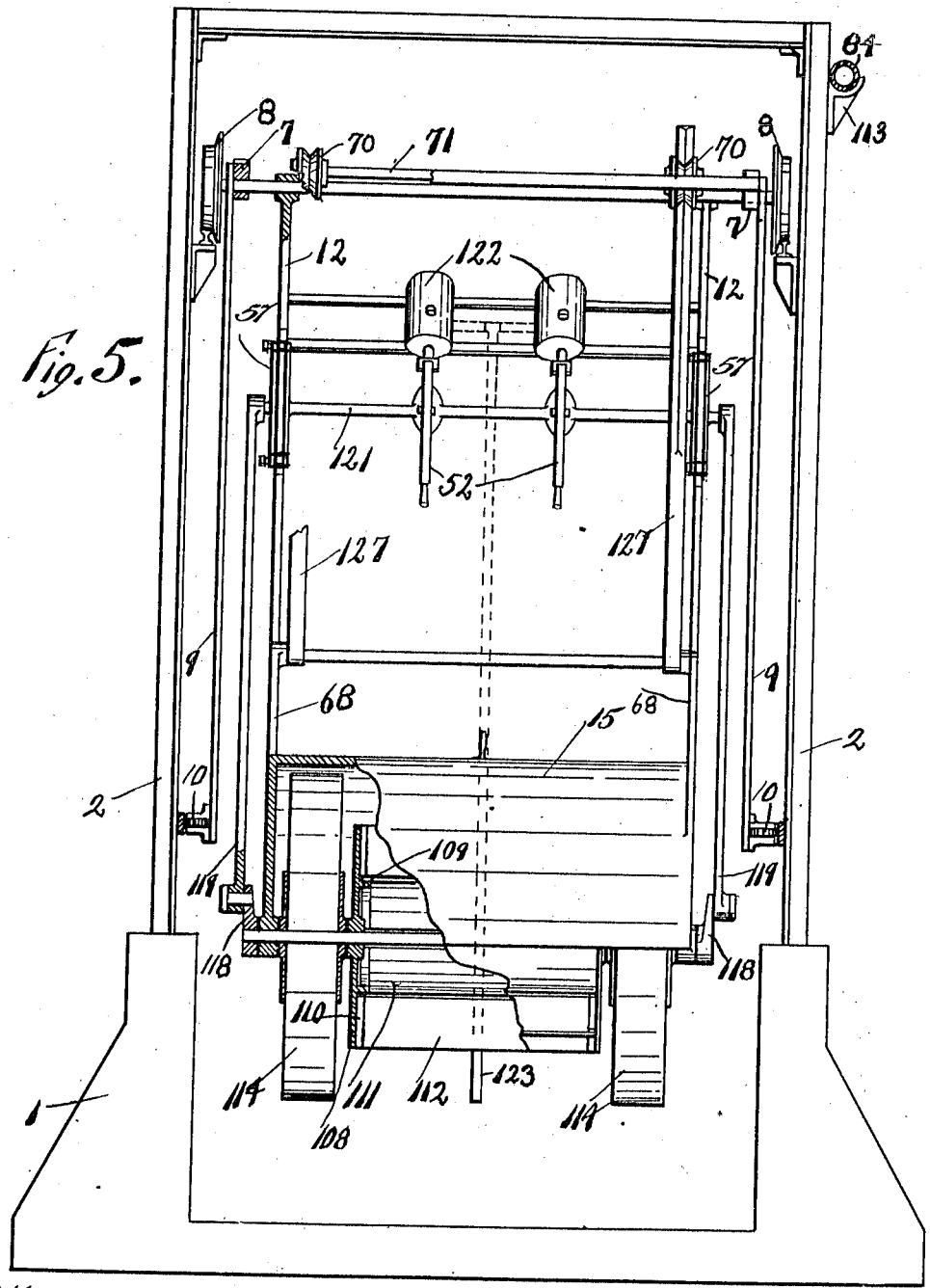
Figure 6:
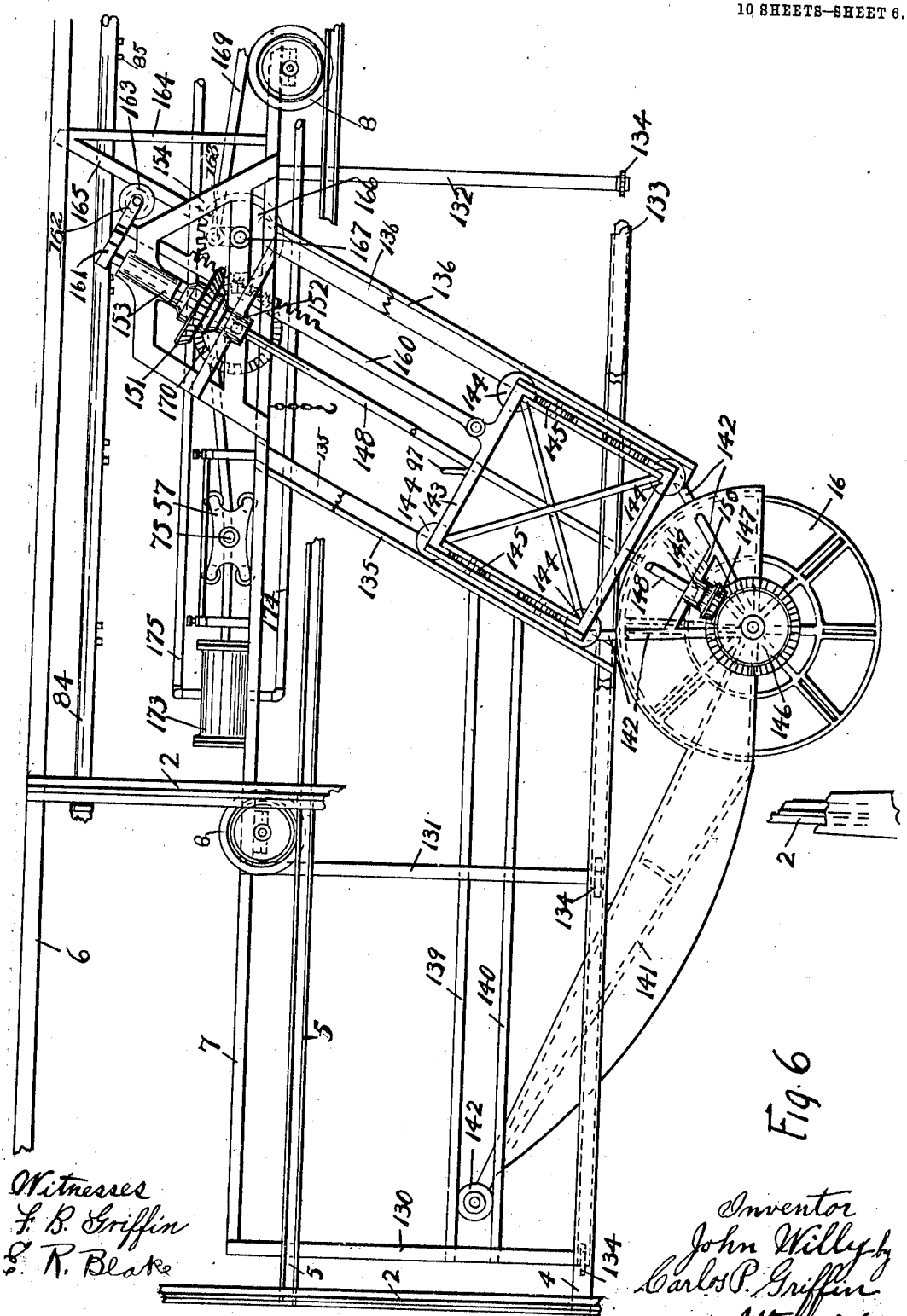

In the drawings in which the same numeral of reference is applied to identical portions throughout all of the views, Figure 1 is a side elevation of the invention showing a portion of its supporting structure, the large arrow thereon indicating the seaward side and the direction from which the waves strike the float; Fig. 2 is a plan view of the apparatus shown in Fig. 1; Fig. 3 is an end elevation of the apparatus shown in Fig. 1, a portion of the paddle wheel and the hood thereof being broken away for the purpose of illustration. Fig. 4 is a side elevation of a slightly modified form of the invention, a portion of the supports thereof being broken away for the purpose of illustration. Fig. 5 is a front elevation of the apparatus shown in Fig. 4. Fig. 6 is a side elevation of a slightly modified form of the invention in which the power transmission apparatus is applied adjacent the paddle wheel. Fig. 7 is a front elevation of the form of the invention shown in Fig. 6. Fig. 8 is a plan view of the cross bar used to support the reciprocating shafts and rack bars used in the form of the invention shown in Fig. 6. Fig. 9 is a longitudinal sectional view through the float and the hood over the paddle wheel. Fig. 10 is a transverse sectional view of the float, the two air compartments therein being illustrated. Fig. 11 is a side elevation of the cross head guiding frame. Fig. 12 is an end elevation of the cross head guiding frame, the top and bottom rails thereof being shown in section on the dotted lines shown in Fig. 11. Fig. 13 is an end elevation of one of the cross heads illustrating the rollers thereof and plates securing the same in place. Fig. 14 is a plan view of one of the bevel gears having one of the bearings thereof removed therefrom. Fig. 15 is a vertical sectional view through one of said bevel gears driven by the reciprocating shafts 148 shown in Fig. 6. Fig. 16 is a plan view of one of the reciprocating cross bars showing the method of attachment of one of the pump cylinders thereto. Fig. 17 is a side elevation of one of the pump links showing it seated in the spring holders on the reciprocating cross bar, the latter being shown in section. Fig. 18 is a plan view of a portion of one of the reciprocating cross bars showing the spring abutments carried thereby. Fig. 19 is a side elevation of one of the spring clips used on the reciprocating cross bars. Fig. 20 is a side elevation of one of the supporting arms carrying the float shown in Fig. 1. Fig. 21 is a view in side elevation of a slightly modified form of paddle wheel, certain of the paddles being omitted for the purpose of illustrating the invention. Fig. 22 is a side elevation of the boss used to hold the paddles in place on the paddle wheel shown in Fig. 21 and showing one of the paddles in place. Fig. 23 is an edge view of the boss used on the paddle wheel shown in Fig. 21; and Fig. 24 is a vertical sectional view of one of the floats used in the form of the invention shown in Fig. 21.

The numeral 1 represents the pier foundations which are of concrete and which have the upwardly extending steel supports 2 embedded therein, said steel supports being connected at the bottom by means of a transverse steel bar 3. This forms a substantial base for the supports 2, and since the base may be of any desired width, it is only necessary to place it upon the bottom where it is to remain, no piling being required. There are such a number of these bents as may be necessary to extend from the high water line to the low water line, and the bents are connected by means of a guide rail 4 on each side, truck supporting rails 5 and upper connecting rails 6, the latter being used to insure rigidity in the pier proper.

It is, of course, contemplated, that such additional bracing may be used as becomes necessary, but this is not shown, since it forms no part of the invention.

Supported upon the rails 5 is the truck 7, said truck having four wheels 8 and having depending side frames 9 to prevent the truck from being turned sidewise. At the bottom of the frame 9 at each side of the truck there are three rollers 10, which bear upon the bars 4 and prevent the frame 9 from sticking therein when the truck is moved from place to place as is necessary at changes of the tides. Supported upon the bearings projecting from the bars 4 4 at one end of the truck are downwardly extending members 12, said members being properly trussed and connected together, and they are covered over to form air chambers 13 and 14. At the lower end of the members 12, a hood 15 is extended over the paddle wheel 16, said paddle wheel being journaled upon the shaft 17 at the lower end of the members 12. Connecting the upper portion of the truck and the frame 9 are two arc shaped guides 18 and 19, said guides having the radius of the members 12, and forming means whereby the paddle wheel is caused to move in the same path at all times. Anti-friction wheels 20 being secured to the hood 15 and members 12 respectively. The shaft 17 carries a bevel gear 22 at each end thereof, and each bevel gear is in mesh with a bevel gear 23 on a shaft 24. The latter shaft extending from the lower portion of the members 12 to the upper portion thereof, and having a bevel gear 25 thereon, which latter is in mesh with a bevel gear 26 on a transverse crank shaft 27. The crankshaft 27 is journaled in suitable boxes in the truck 7 and it is provided with two cranks 28. The side rails of the truck 7 are connected by means of cross bars 29, 30, 31, 32, 33, 34, 35, 36, 37, 38, and 39, upon which cross bars flooring may be placed as desired.

It will be observed that nearly under the cross bar 31 is a second cross bar 40. The bars 31 and 40, being spaced far enough apart to permit the necessary vertical movement of the pitmen 42. The shaft 27 extends entirely across the truck and is supported at its ends at the sides of the truck and near the center on bars 44 which extend from the cross bar 29 forwardly and upwardly to the cross bar 31.

It will be observed that the bar 44 has a bearing 45 thereon which supports the side members 12, said bearing relieving the shaft 27 which passes therethrough of the weight of the paddle wheel and inclined support carrying the same. The pitmen 42 are connected with a bar 46, said bar having enlargements 47 thereon which carry the spring members 48.

The spring members 48 are intended to relieve the shock of the pumps and are formed of a thin plate having depending ends 49 and 50. The depending end 49 being inclined to permit the easy insertion between said plates of the point 58 of the pump link 52 see Figs. 16, 17, and 19.

The upper portion of the member 48 moves in a recess of the enlargement 47 and the depending ends are connected by means of a bolt 53, a heavy spring 54 being placed thereon to hold the member 48 tightly against the point 58. There are two of these members 48 in each enlargement 47 of the rod 46 and each one retreats into a recess 55 in said enlargement when a heavy thrust is put upon the point 58.

The point 58 is broad enough so that when such a heavy thrust is put upon it that it strikes the shoulders 56, said shoulders preventing the destruction of the springs 54. The bar 46 is supported at its ends by means of plates 57, which plates carry four guide wheels 58 running on tracks 59 and 60 see Figs. 11 and 12. The upper track 60 is supported by means of slotted uprights 61 and said upper track 60 is adjustable in said slotted uprights 61 to enable the plate 57 to be properly held in position when the bar is reciprocated back and forth by the pitmen. This guide construction is repeated on each side of the truck 7.

Supported upon the cross bars 32 and 40 are two pump cylinders 62 and 63, each having piston rods 64. Each of the piston rods 64 is provided with one of the links 52 to enable the pump to be operated from the rod 46. Facing in the opposite direction from the pumps 62 and 63 and supported upon the cross bars 33 and 36 are two other pump cylinders 65 and 66, each cylinder having a piston rod 67 and having connected therewith the link 52. Near the other end of the truck is a separate pump system operated by the rise and fall of the paddle wheel and member 12. Connected with the hood 15 on each side thereof is a frame 68 which has a rack bar 69 pivoted thereto, there being two of said rack bars, one at each end of said paddle wheel.

The rack bar is supported upon one side by means of a roller 70 carried on a shaft 71, said roller having its periphery V shaped to prevent side motion of the rack bar. The teeth of the rack bar mesh with a gear wheel 72, said gear wheel being carried by means of a shaft 73 supported in brackets 74 a short distance above the top of the truck.

It is to be noted that there are two of the rollers 70 and two of the gears 72. The shaft 73 is provided with two cranks 74 which have the pitmen 43 connected therewith. The pitmen 43 connect with a bar 75 exactly similar to the bar 46 and each is provided with the same accessories, and each is connected at will with the pumps 76, 77, 78 and 79, the same as the pumps 62, 63, 65 and 66 are connected to the bar 46.

A suitable inlet pipe 80 is connected with the pump system, a portion of said connection being omitted for clearness, and an outlet pipe 81 is also connected with said pump system. Said outlet pipe having flexible hose 82 and 83 to connect with the main discharge pipe 84.

It will be observed that the main discharge pipe has a plurality of hose connections depending therefrom, the object being to connect one set of said hose with one set of said connections while the other set is connected with another set of connections 85 on the pipe 84. It is thus possible to move the truck longitudinally without stopping the flow of water through the discharge pipe 81. It is, of course, assumed, that suitable valves will be placed in said pipe system to direct the flow of the water at will.

In order that the paddle wheel and float may be raised out of the water when it is desired to repair the same or do other work in connection therewith, or to avoid injury thereto in storms a shaft 87 is supported on the top of the brackets 74 and secured to one of said brackets 74 is a laterally extending frame 88 having a plate 89 to confine the wheel 90 which is used for the purpose of moving said shaft longitudinally. This wheel 90 is threaded on the shaft 87 and by rotating said wheel the shaft may be moved longitudinal sufficiently to engage the small gear wheels 91 with the gear wheels 72, and when said gear wheels are so engaged a link 93, hinged on the frame 88 may be dropped into the grooved hub 94 on the shaft 87 to prevent said wheels from becoming disengaged. The float may then be lifted by turning the crank 95 and when it is as high as may be desired the chain 96 may be hooked into rings 97 on the housing 15.

Since it is contemplated that this apparatus shall be used over a considerable distance, owing to changes in the tides and in the position of the largest breakers, cables 98 and 99 are provided for moving the truck in opposite directions.

The cables are connected at their ends with suitable fixed portions of the pier and they pass in opposite directions around the drums 100 on the shaft 101. This shaft 101 is operated by means of a gear wheel 102 carried thereby, said gear wheel being in mesh with a small gear 103 on a short shaft 104, which latter is turned with the crank 105.

The gear wheel 102 is provided with a plurality of holes 106, the object being to shift the position of the truck as may be desired, and then to insert a bar through one of said holes to hold the truck in the desired position. The paddle wheel 16 is formed with a disk 108 at each end, each of said disks having a circular flange 109 and radial flanges 110. The circular flange of said disk is for the purpose of securing the air drum 111 to the said disk and the radial flanges 110 are for the purpose of securing the paddle blades 112 to said wheels. The object of providing said paddle wheel with the drum 111 is to give said paddle wheel sufficient buoyancy to forcibly lift all of the apparatus connected to said depending members 12, and the object of the air chambers 13 and 14 is to receive the impact of larger waves and prevent them from striking the paddle wheel above the axis thereof, and also to assist in lifting the paddle wheel and attachments. The discharge pipe 84 is supported adjacent the uprights 2 by means of brackets 113.

The operation of this form of the invention is as follows:—........ The arrow on Fig. 1 indicated the direction of movement of the incoming breakers and the truck is moved to the position which seems to give the best effect. The breakers will lift the paddle wheel and its attached rack bars, thus rotating the crank shaft 73 and operating the pumps. At the same time, the movement will tend to rotate the paddle wheel and its rotation will cause the rotation of the shaft 24, thus operating the pumps connected therewith. Very heavy breakers may strike the bottom of the chamber 14, in which event they will be more or less retarded and the float will assist the float secured to the paddle wheel in lifting the rack bars 69 in the operation of the pumps. Owing to the fact that the pumps are handling an incompressible fluid, viz., water, it makes no difference whether they complete their stroke or not, but will pump water in which ever direction the pistons move. It is, of course, to be understood that the water is to be delivered from the pipe 84 to some suitable reservoir where it may be stored for use.

It is to be observed that when the apparatus is to be used in quite shallow water that it may be necessary to provide means for protection to the paddle wheels in the shape of air drums 114 which are loosely journaled on the shaft carrying the paddle wheel. These air drums are carried by the same shaft as the paddle wheel and one is provided at each end of said paddle wheel, said air drums being of such diameter as to support the paddle wheels clear of the ground, as shown in the view illustrating the same, when the water has receded far enough to permit this, thus allowing the paddle wheel to rotate freely at all times.

The above figure showing the air drums supporting the paddle wheels above the surface of the ground also illustrates a slightly modified form of the invention, in that the members 12 are supported from the truck 7 by means of boxes 116, said boxes being secured to said truck with suitable bolts 117. In this instance the shaft supporting the paddle wheel 16 is supplied with a pair of cranks 118. Connected with the cranks 118 are pitmen 119 which are connected at the other end to suitable cross heads 120, the same as the cross heads 57 shown in Fig. 1 and both have the same kind of bearings. There are two of the cross heads 120 and they are connected by means of a bar 121 which is provided with two of the enlargements 47 similar to the bar 46 and similarly equipped with springs.

Carried on the upper side of the members 12 are two pump cylinders 122, and connected with the piston rods thereof are the links 52 the same as shown in Fig. 1, the object being to operate either or both of said pump cylinders 122 as may be desired. The pump cylinders are connected with a suitable supply pipe 123 and they have flexible discharge connections 124 which connect with the discharge pipes 126, said discharge pipes 126 having the flexible connections 82 for connection with the main discharge pipe 84. Connected with the upper part of the hood over the paddle wheel 16, and air drums 114 are two rack bars 127, exactly the same as the rack bars 69 shown in Fig. 1, and said rack bars 127 of which there are two are connected with gears and pumps exactly the same as the gears and pumps connected with said rack bars 69, the operation being precisely the same.

In Fig. 6 is shown another slightly modified form of construction in that the paddle wheel is allowed to move in a straight line instead of in an arc as in the preceding figures. In this form of the invention, the truck 7 has depending bars 130, 131 and 132 connected with a lower frame 133, and rollers 134 are provided at three places on said frame to prevent the same from binding against the guides 4. Connected with the upper portion of the truck 7 and with the bars 133 at the bottom thereof are four angle bars 135 and 136. Connected with the bars 130 and 131 and the bar 135 are two rails 139 and 140, said rails forming the support for the upper end of the float 141, a roller 142 being secured to said float to permit the motion thereof with as little friction as possible. The braces 142 connect the paddle wheel shaft and rectangular frame 143, which frame is provided with eight anti-friction rollers 144 and eight anti-friction rollers 145. The bars 135 and 136 form an inclined slide in which the frame 143 is movable, said rollers 144 and 145 being provided to prevent undue friction in the movement of said frame when it is raised and lowered by the waves. It will be observed in this instance that the paddle wheel moves in a straight line parallel to the rails 135 and 136. The result of this construction is that the upper end of the float 141 reciprocates back and forth on the roller 142 a small amount. Each end of the paddle wheel shaft is provided with a bevel gear 146 which is in mesh with a small bevel gear 147 on the lower end of the shaft 148. The shaft 148 is journaled in a box 149 supported by means of a cross bar 150 secured to the braces 142, and the shaft passes through the hub of a bevel gear 151 at its upper end, said bevel gear being supported in suitable bearings 152 and 153 on a frame 154 at the top of the truck 7. This bevel gear is of such construction that it can be rotated by the shaft 148 while the said shaft is reciprocated longitudinally therethrough. Said gear comprises a central portion 155 with which the gear proper is cast integral, recesses 156 being provided for rollers 157. The rollers 157 are four in number, two above the plane of the bevel gear and two below the same, and they are so placed as to bear upon the square portion of the shaft 148, and they transmit the torque of said shaft to said gear 151. At each side of the gear a hood 158 is secured thereto, said hood having an opening larger than the shaft 148 which passes therethrough. Each hood is provided with a bearing 159 to support the bevel gear. These two shafts 148 transmit any rotary motion from the paddle wheels to the pump system as will be explained later, but in addition to this rotary motion there is power produced by the rise and fall of the float paddle wheels, and since the paddle wheel is directed in a straight line in its rise and fall by the rails 135 and 136. It is possible to produce power therefrom, readily by means of a rack bar 160 which is connected at its lower end to the upper portion of the frame 143. There are two of these rack bars 160, one at each end of the frame 143 and they are connected at their upper ends to a cross bar 161, which cross bar also forms a support for the upper ends of the shafts 148, the object being to provide means whereby said shafts and said rack bars may be reciprocated without undue friction upon the shafts to which they transmit motion.

The bar 161 carries a pair of brackets 162, said brackets supporting grooved rollers 163. Extending above the truck is a perpendicular support 164 which is connected with an inclined rail 165 which forms a support for the rollers 163. The object of this is to carry the weight of the rack bars with as little friction as possible and in this way permit the entire power transmitted to them to be utilized by the gear 166 with which they are in mesh there being one gear for each rack bar, said gears being supported upon the crank shaft 167 which is journaled in the frame 154. The crank shaft 167 is provided with two cranks 168, each having a pitman 169 connected therewith and which is connected to a pump system the same as used with the other forms of the invention, but which is not shown in this figure.

The bevel gear 151 is in mesh with a bevel gear 170 on a shaft 171, said shaft being journaled in the frame 154 at substantially the same level as the shaft 167. This shaft 171 is provided with suitable cranks to which are connected pitmen 172 which are connected at their other ends to one of the reciprocating bars 75, said bar having a plate 57 carrying the usual antifriction bearings at each end thereof.

The bar 75 is connected with any one of several pump cylinders 173, the same as are the bars 75 in the other forms of the invention, said pump cylinders having an inlet pipe 174 and a discharge pipe 175 in connection with the main discharge pipe 84, the connection being made in the same manner as that previously described.

It is intended in every instance that the truck shall be moved along the rails 5 to such a place as will produce the best results from the breakers of the surf at whatever stage the tide may be.

From the above description it will be seen that in operation the pumps will be reciprocated either by the rotary movement of the paddle wheels or by the up and down movement of the paddle wheel and the float to which it is secured. The result being that the most effectual form of structure to resist the effect of the waves is produced. It is to be noted that the pumps will lift water regardless of the amount the pistons are reciprocated since each pump is equipped with the usual valve system, and since the fluid handled thereby is substantially incompressible, so that while the paddle wheel may not completely rotate it will cause more or less rotation of the crank shaft to which it is connected and the rack bars will cause a greater or less rotation of the gears in mesh therewith which will cause a corresponding movement of the pistons connected thereto.

In the last form of the invention the operation is substantially the same save that the paddle wheel is caused to move in a straight line by the guides, the upper end of it being supported to move longitudinally and also through whatever angle the paddle wheel moves in its travel up and down.

In the form of the invention shown in Fig. 21, the numeral 180 represents a shaft having a crank 181 at each end, and this shaft is provided with a larger float 182 adjacent each end, and the shaft supports four other floats 183 which are smaller in diameter than the large float. These floats 183 are separated from the floats 182 and from each other by means of disks 184. Each of these disks is provided with eight grooves 185 for the insertion therein of the bases of the paddles 186. It will be noted that there are five rows of these paddles, there being eight paddles in each row, suitable bolts securing the paddles in place in the disks. The floats 183 are formed of any suitable material and are secured to a boss 187, said boss being forced tightly upon the shaft 180. The disks holding the paddles and the intermediate floats are secured tightly upon the shaft 180 and any motion of the waves tends to rotate said shaft, but the floats 182 are loosely journaled upon said shaft in order that the power of the waves may be exerted to rotate the paddles and drums 183 even though the larger floats 182 are resting upon the surface of the ground in shallow water, said floats 182 being of sufficient diameter to prevent injury to the paddles and smaller floats.

Having thus described my invention what I claim as new and desire to secure by Letters Patent of the United States is as follows:—

1. In a wave motor a longitudinally movable truck, a float shield pivoted thereto, a revoluble floating paddle wheel carried at the lower end of said float, pump systems, and means to transmit the rotary motion of said floating paddle wheel to one set of pumps and means to transmit the up and down motion of said paddle wheel to another set of pumps, substantially as set forth.

2. In a wave motor, a longitudinally movable truck, a pivoted float shield carried thereby, a floating paddle wheel carried at the lower end of said float, a rack bar connected with the lower end of said float and means whereby the reciprocating motion of said rack bar is transformed into rotary motion, and pumps connected with said power transmitting means, substantially as set forth.

3. In a wave motor, a longitudinally movable truck, a pivoted float shield carried thereby, a revoluble floating paddle wheel at the lower end of said float, pump systems, means to transmit the rotary motion from said floating paddle wheel to one set of pumps, and a rack bar connected with the lower end of said float shield, to transmit motion to another set of pumps, substantially as set forth.

4. In a wave motor, a longitudinally movable truck, pump systems carried thereby, a float shield pivoted to said truck, a floating paddle wheel carried by the lower end of said float shield, means to transmit the rotary motion from said floating paddle wheel to certain of said pumps, a rack bar connected to the lower end of said float shield, and means whereby the reciprocating motion of said rack bar will be transmitted to certain of said pumps, substantially as set forth.

5. In a wave motor, a truck, a wave power transforming means, depending therefrom, rails supporting said truck, cables and a windlass adapted to change the position of said truck at will, substantially as set forth.

6. In a wave motor, a truck, a float shield depending therefrom, a floating paddle wheel journaled at the lower end of said shield, floats carried by said wheel and revoluble therewith, and means to transmit power from said floats and wheel to pump systems, substantially as described.

7. In a wave motor, a longitudinally movable truck, a float shield pivoted thereto and depending therefrom, a floating paddle wheel journaled at the lower end of said float shield, a hood covering the upper portion of said floating paddlewheel, a pump system, and means to transmit said rotary motion from said paddle wheel to said pump system, substantially as set forth.

8. In a wave motor, a longitudinally movable truck, a float shield depending therefrom and pivoted thereto, a floating paddle wheel journaled at the lower end of said float shield, a hood covering the upper portion of said paddle wheel, a pump system, and means whereby the up and down motion of said floating paddle wheel will be transmitted to said pump system, substantially as set forth.

9. In a wave motor, a truck, a float shield depending therefrom, a floating paddle wheel journaled on a shaft at the lower end of said shield, a float at each end of said floating paddle wheel on said shaft of greater diameter than the paddle wheel and freely revoluble on the shaft, a pump system, and means to transmit power from said paddle wheel to said pump system, substantially as set forth.

10. In a wave motor, a longitudinally movable truck, a float shield pivoted thereto, and depending therefrom, a floating paddle wheel journaled at the bottom of said float shield, an air drum at each end of said paddle wheel and of greater diameter than said paddle wheel, pump systems, means to transmit the rotary motion from said paddle wheel to certain of said pumps, and means to transmit the up and down movement of said float, drums and paddle wheel to either set of pumps, substantially as set forth.

11. In a wave motor, a longitudinally movable truck, a float shield depending therefrom, a floating paddle wheel at the lower end of said float shield and freely movable up and down with the undulations of the waves, pump systems, gear wheels and shafts for transmitting the rotary motion of said paddle wheel to certain of said pumps, a rack bar connected with the lower end of said float and gear wheel whereby the reciprocating motion of said rack bar may be transmitted to other of said pumps, substantially as set forth.

12. In a wave motor, a truck, a float shield depending therefrom, means to transmit power from said float shield, a plurality of pumps, and means whereby any one of said plurality of pumps may be connected with said power transmitting means, substantially as set forth.

13. In a wave motor, a truck, a float depending therefrom, power transmitting means connected with said float, pump cylinders, and a reciprocating bar connected with the power transmitting means and pivoted links connected with the pump piston rods, any one of which is adapted to be connected at will with said reciprocating bar, substantially as set forth.

14. In a wave motor, a truck, a float depending therefrom, means to transmit power from said float, a paddle wheel carried by said float, means to transmit power from said wheel, pump systems, a reciprocating bar connected with said power transmitting means, a pivoted link connected with each pump piston any one of which is adapted to be connected with said reciprocating bar to drive said pump pistons, substantially as set forth.

15. In a power transmission means for wave motors, a bar, a cross head at each end of said bar, oppositely placed spring abutments carried by said bar, a pump having a piston rod, a link pivoted to said piston rod and having means to pass between said spring abutments to drive said piston rod when said bar is reciprocated, substantially as described.

16. In a wave motor, a truck, a float shield pivoted thereto, a floating paddle wheel carried thereby at the lower end thereof, means to transmit power from said float and said paddle wheel, and guides secured to said truck to direct the movements of said paddle wheel and float shield, substantially as described.

17. In a wave motor, a truck, a float frame pivoted thereto, rack bars secured to said frame and projecting above said truck, gears in mesh with said bars, a slidable shaft having small gears thereon to mesh with the first named gears at will, means to turn said shaft and means to support said float in a raised position, substantially as described.

18. In a wave motor, a pier having a track extending longitudinally thereof, a truck movable upon said track, a wave motor secured to said truck, anti-friction rollers carried by said truck, and guide rails against which said rollers bear, substantially as described.

19. In a wave motor, a truck, a depending float shield pivoted thereto, a revoluble paddle wheel journaled at the lower end of said float shield, air drums of greater diameter than said paddle wheel carried by the shaft thereof, a plurality of other air drums secured to said paddle wheel and revoluble therewith, pump systems, and means whereby the motion is transmitted from said paddle wheel to said pump systems, substantially as described.

20. In a wave power, a water wheel, a power shaft, arc-shaped guide-ways in which the water wheel is slidable, the center of the guide-ways being the power shaft, and means connecting the water wheel and power shaft.

In testimony whereof I have hereunto set my hand this 16" day of August A. D. 1910, in the presence of the two subscribed witnesses.

JOHN WILLY.

Witnesses:
C. P. GRIFFIN,
CHARLES R. HOLTON.